(12) United States Patent
Jung et al.

(10) Patent No.: US 12,308,375 B2
(45) Date of Patent: May 20, 2025

(54) BATTERY PACK LOADING APPARATUS AND BATTERY PACK LOADING METHOD USING THE SAME

(71) Applicant: LG ENERGY SOLUTION, LTD., Seoul (KR)

(72) Inventors: Young Sung Jung, Daejeon (KR); Seung Hee Chae, Daejeon (KR); Ki Seok Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 383 days.

(21) Appl. No.: 17/628,329

(22) PCT Filed: Mar. 16, 2021

(86) PCT No.: PCT/KR2021/003216
§ 371 (c)(1),
(2) Date: Jan. 19, 2022

(87) PCT Pub. No.: WO2021/194147
PCT Pub. Date: Sep. 30, 2021

(65) Prior Publication Data
US 2022/0255111 A1    Aug. 11, 2022

(30) Foreign Application Priority Data

Mar. 26, 2020 (KR) .................. 10-2020-0036740

(51) Int. Cl.
*H01M 10/04* (2006.01)
*H01M 50/204* (2021.01)
(Continued)

(52) U.S. Cl.
CPC ..... *H01M 10/0404* (2013.01); *H01M 50/204* (2021.01); *H01M 50/244* (2021.01); *H01M 50/251* (2021.01)

(58) Field of Classification Search
CPC .......... H01M 50/20–213; H01M 50/233–253; H01M 10/04–0413; H01M 10/42–4214; H01M 10/4285
See application file for complete search history.

(56) References Cited

U.S. PATENT DOCUMENTS

2012/0068664 A1* 3/2012 Franzen .................. B60S 5/06
414/277

FOREIGN PATENT DOCUMENTS

CA    2 781 346 A1    12/2013
CN    107855711 A    3/2018
(Continued)

OTHER PUBLICATIONS

Machine translation of Kim, KR-101806236-B1. Originally available Dec. 1, 2017. (Year: 2017).*
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP

(57) ABSTRACT

A battery pack loading apparatus and a battery pack loading method using the same includes a seating unit configured to allow a battery pack to be seated thereon; a rotation unit configured to rotate the battery pack on the seating unit by a predetermined angle; a first transfer unit configured to move the battery pack rotated by the predetermined angle to a predetermined position; and a second transfer unit configured to transfer the battery pack transferred by the first transfer unit to a battery rack and a battery pack loading method using the same.

14 Claims, 7 Drawing Sheets

(51) Int. Cl.
*H01M 50/244* (2021.01)
*H01M 50/251* (2021.01)

(56) References Cited

FOREIGN PATENT DOCUMENTS

| CN | 108075169 | A | * | 5/2018 | ............ | B60L 50/50 |
| CN | 207688637 | U | | 7/2018 | | |
| CN | 108637848 | A | | 10/2018 | | |
| JP | 10-326605 | A | | 12/1998 | | |
| JP | 2010-186568 | A | | 8/2010 | | |
| JP | 5283527 | B2 | | 9/2013 | | |
| JP | 2014235932 | A | * | 12/2014 | ............ | Y02E 60/10 |
| JP | 2015-149180 | A | | 8/2015 | | |
| KR | 10-1133047 | B1 | | 4/2012 | | |
| KR | 10-2012-0106088 | A | | 9/2012 | | |
| KR | 10-2013-0102976 | A | | 9/2013 | | |
| KR | 10-1313073 | B1 | | 9/2013 | | |
| KR | 10-2014-0087780 | A | | 7/2014 | | |
| KR | 10-2016-0009701 | A | | 1/2016 | | |
| KR | 10-2016-0048453 | A | | 5/2016 | | |
| KR | 10-1654102 | B1 | | 9/2016 | | |
| KR | 10-1799537 | B1 | | 11/2017 | | |
| KR | 101806236 | B1 | * | 12/2017 | ........ | H01M 10/0436 |
| KR | 10-2018-0092029 | A | | 8/2018 | | |
| WO | 2012/105530 | A1 | | 8/2012 | | |

OTHER PUBLICATIONS

Machine translation of Nemoto, JP-2014235932-A. Originally available Dec. 15, 2014. (Year: 2014).*
Machine translation of Cha, KR 2014-0087780 and KR 102037209. Originally available Jul. 9, 2014. (Year: 2014).*
Machine translation of Oh, KR 10-1133047. Originally available Apr. 4, 2012. (Year: 2012).*
Machine translation of Zhang, CN 108075169. Originally available May 25, 2018. (Year: 2018).*
International Search Report (PCT/ISA/210) issued in PCT/KR2021/003216 mailed on Jun. 29, 2021.
Extended European Search Report for European Application No. 21774151.1, dated May 21, 2024.

* cited by examiner

[FIG. 1]
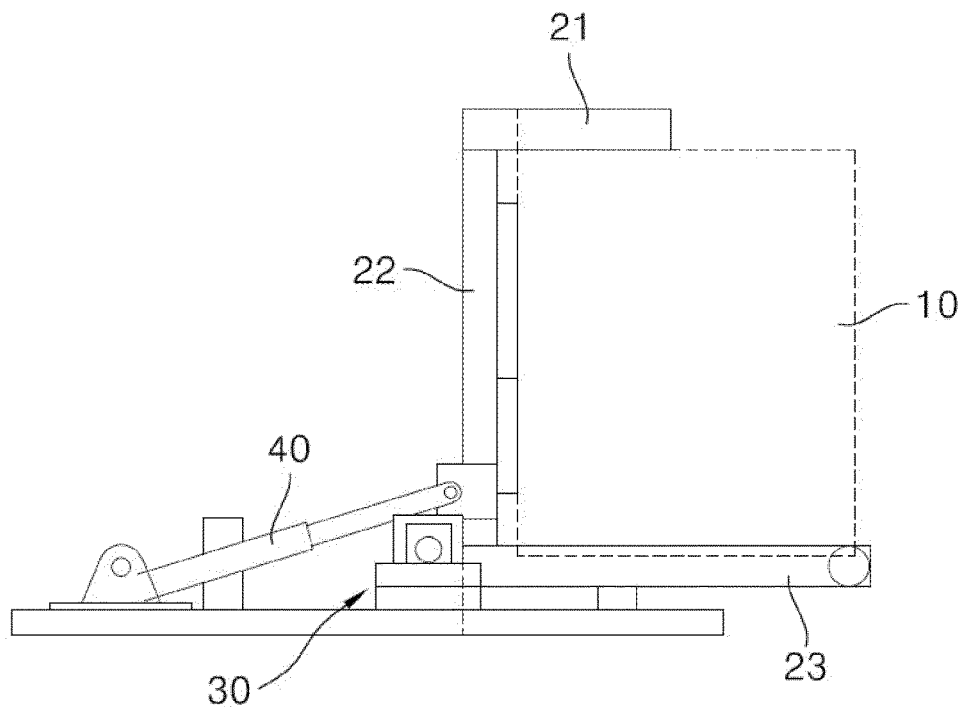
Conventional Art
[FIG. 2]
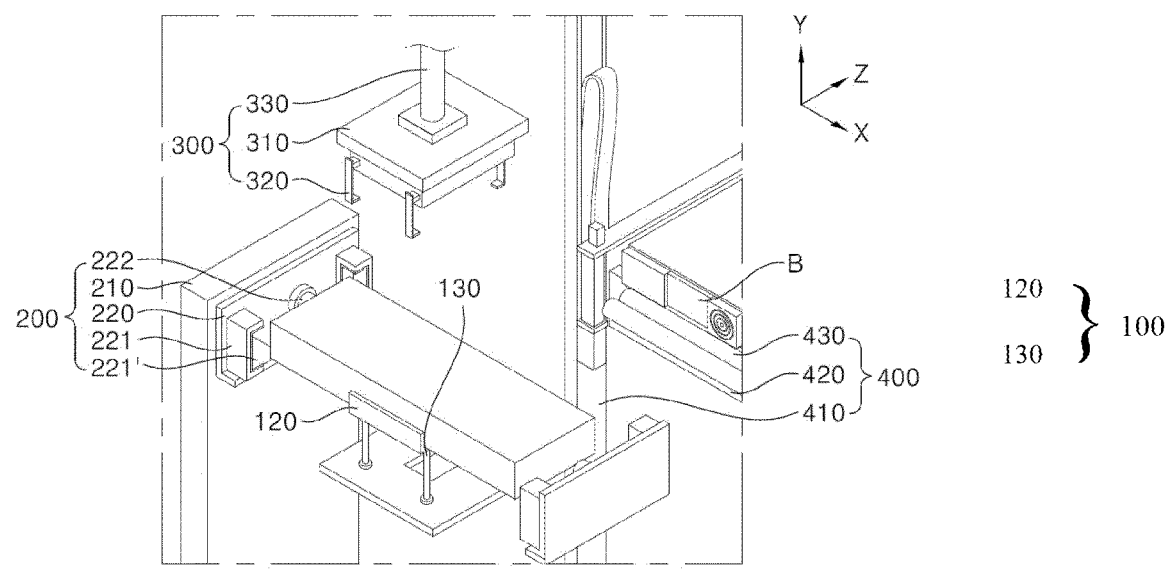

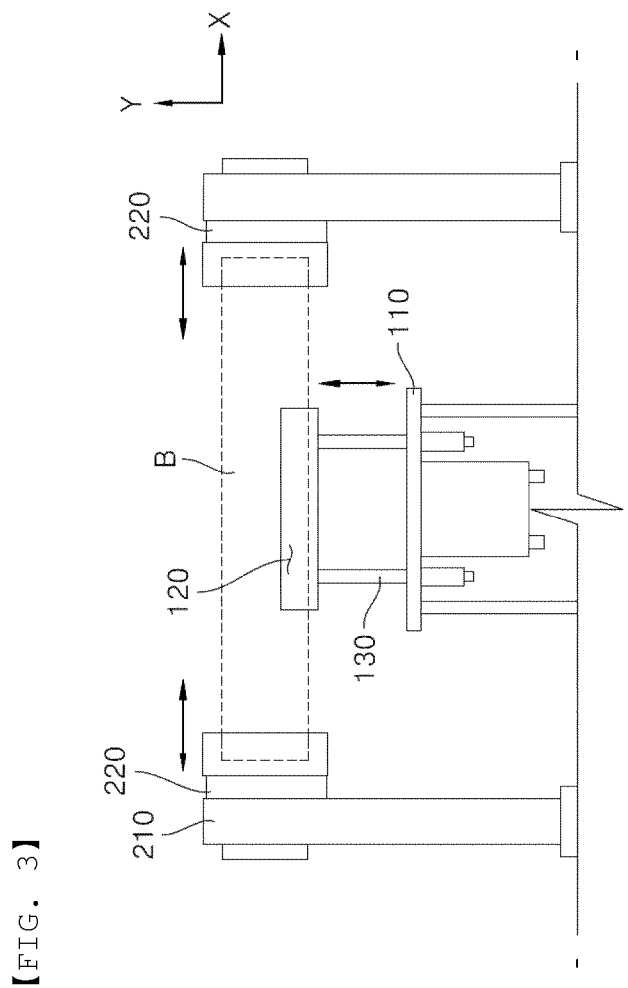
[FIG. 3]

[FIG. 4]
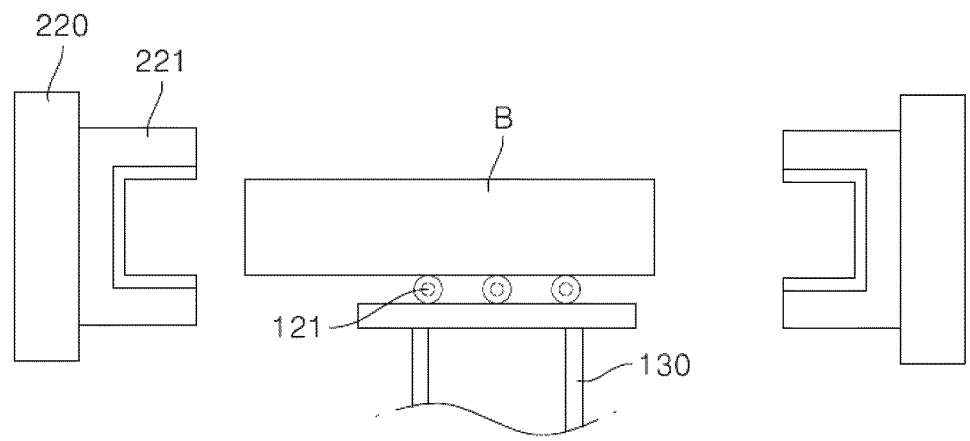
(a)
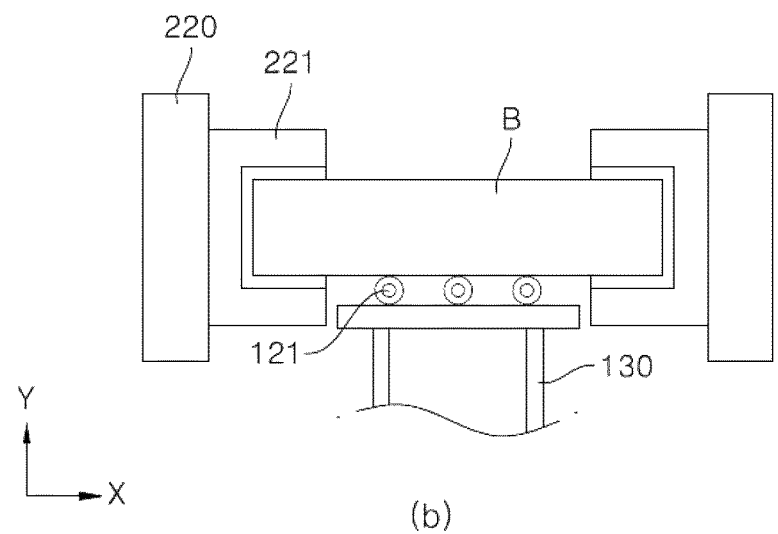
(b)

[FIG. 5]
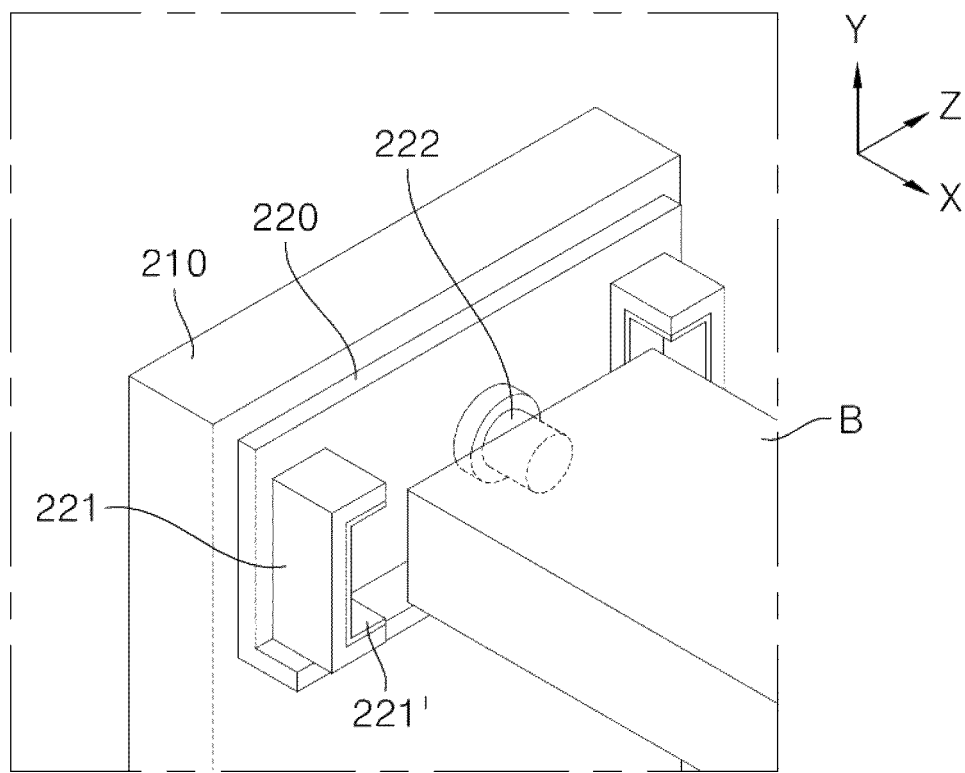
[FIG. 6]
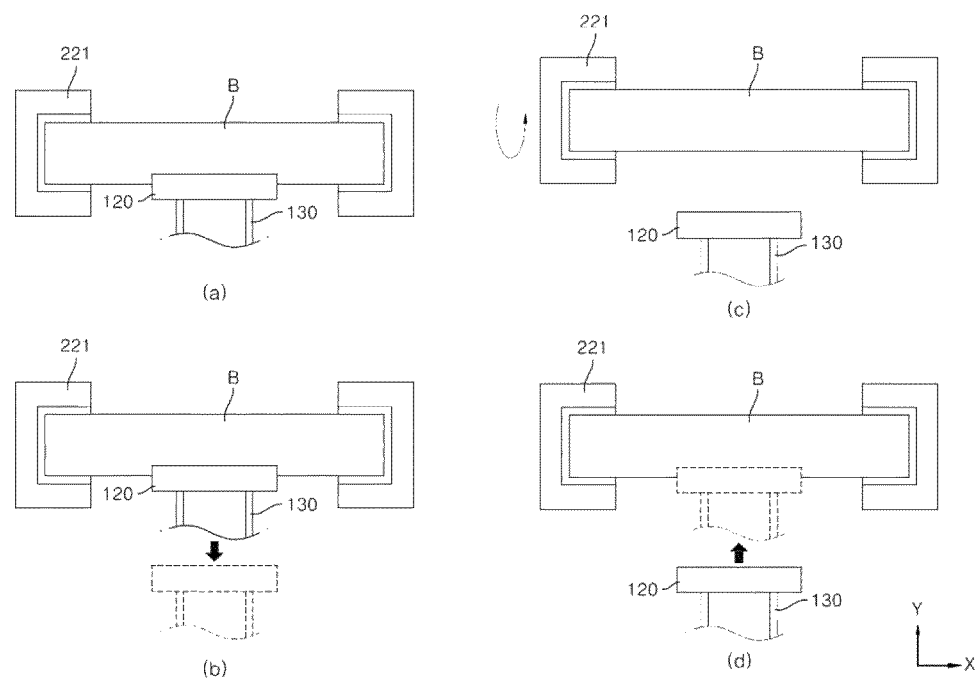

【FIG. 7】
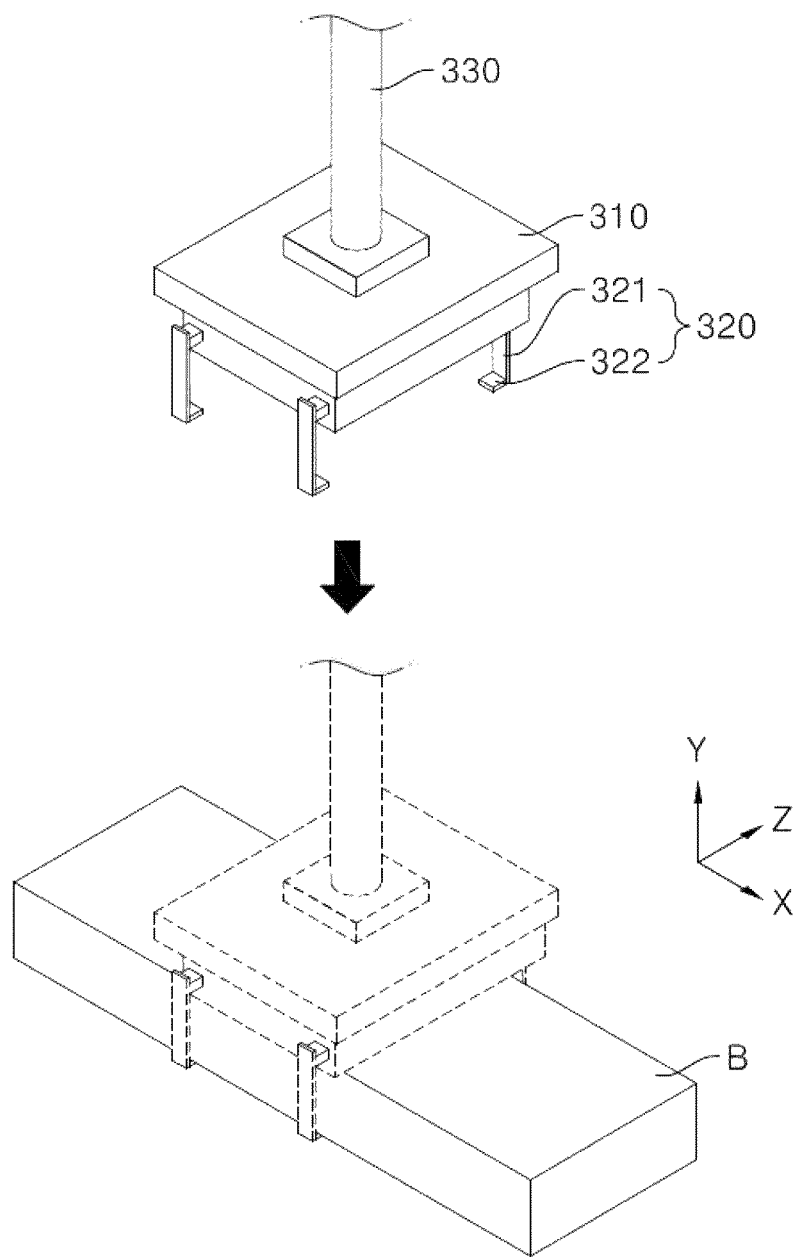

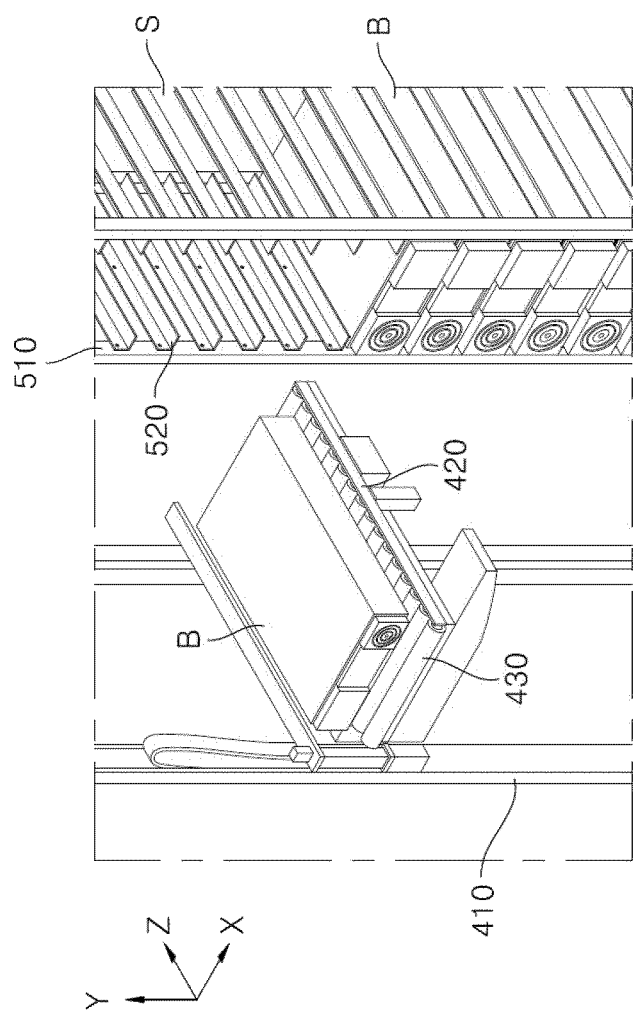

[FIG. 9]
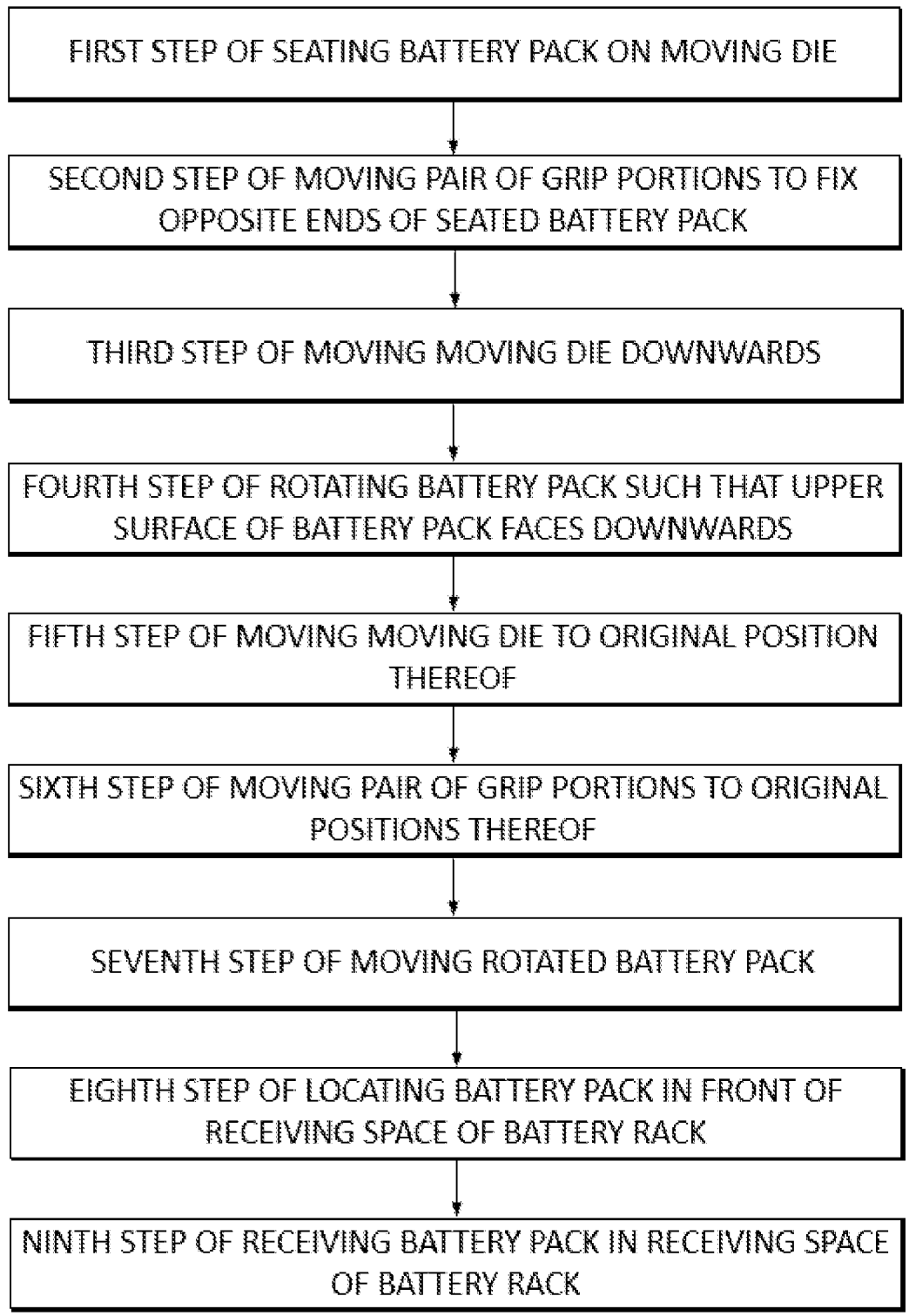

BATTERY PACK LOADING APPARATUS AND BATTERY PACK LOADING METHOD USING THE SAME

TECHNICAL FIELD

This application claims the benefit of priority to Korean Patent Application No. 2020-0036740 filed on Mar. 26, 2020, the disclosure of which is hereby incorporated by reference herein its entirety.

The present invention relates to a battery pack loading apparatus and a battery pack loading method using the same, and more particularly to a battery pack loading apparatus capable of improving safety and workability at the time of loading a heavy battery pack and a battery pack loading method using the same.

BACKGROUND ART

Secondary batteries, which have high applicability to products and electrical properties, such as high energy density, have generally been used in electric vehicles (EV) or hybrid electric vehicles (HEV), each of which is driven using an electrical driving source, as well as portable devices. Such secondary batteries have attracted attention as a new energy source capable of increasing environmental friendliness and energy efficiency, since no by-products are generated as the result of use of energy in addition to a primary advantage in that it is possible to remarkably reduce the use of fossil fuels.

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.5V to 4.5V. In the case in which output voltage higher than the above operating voltage is required, therefore, a plurality of battery cells may be connected to each other in series to constitute a battery pack.

In addition, a plurality of battery cells may be connected to each other in parallel depending on required charge and discharge capacities of a battery pack in order to constitute the battery pack. Consequently, the number of battery cells included in the battery pack may be variously set depending on required output voltage or charge and discharge capacities.

In the case in which a plurality of battery cells is connected to each other in series/parallel to constitute a battery pack, a battery module including at least one battery cell may be manufactured first, and a battery pack may be manufactured using at least one battery module and other components, which is a general method. Here, a battery pack including at least one battery module may be provided for home use, or battery racks including at least one battery pack may be combined to constitute an energy storage system for industrial use, depending on various required voltage and capacity conditions.

Meanwhile, there is a case in which a battery pack must be rotated, i.e. the battery pack must be turned upside down, before the battery pack is loaded in a battery rack. The reason for this is that, for example, a plurality of battery packs must be received in a multilayered structure and then must be electrically connected to each other, and at this time it is necessary to intensively dispose connection wires at one side as much as possible in order to easily manage the connection wires while minimizing the length of each of the connection wires. Since the weight of one battery pack is approximately 100 kg, however, it is difficult for a worker alone to turn the battery pack upside down. Even if possible, there is a high possibility that an accident will occur, whereby safety and workability may be deteriorated.

FIG. 1 is a perspective view illustrating rotation of a battery module using a conventional rotation apparatus. Referring to FIG. 1, there is shown a rotation apparatus configured to insert a battery module 10 into a space defined by a first wall member 21, a second wall member 22, and a third wall member 23, which are configured to wrap the battery module 10, and to pull the wall members using a bearing unit 40 in order to rotate the battery module 10 by 90 degrees based on a stationary unit 30. Since the conventional rotation apparatus is manufactured based on the battery module 10, however, it is difficult to use the conventional rotation apparatus in the case in which the battery module is heavy. In particular, the rotatable angle is limited to 90 degrees.

PRIOR ART DOCUMENT (Patent Document 1) Japanese Patent Application Publication No. 2015-149180

DISCLOSURE

Technical Problem

The present invention has been made in view of the above problems, and it is an object of the present invention to provide a battery pack loading apparatus capable of securing safety, whereby it is possible to reduce an accident occurrence rate, and a battery pack loading method using the same.

It is another object of the present invention to provide a battery pack loading apparatus capable of reducing worker fatigue and shortening work time, whereby it is possible to improve work efficiency, and a battery pack loading method using the same.

Technical Solution

In order to accomplish the above objects, a battery pack loading apparatus according to the present invention includes a seat (100) configured to allow a battery pack (B) to be seated thereon; a rotator (200) configured to rotate the battery pack (B) on the seat by a predetermined angle; a first transferor (300) configured to move the battery pack (B) rotated by the predetermined angle to a predetermined position; and a second transferor (400) configured to transfer the battery pack (B) transferred by the first transferor (300) to a battery rack (500).

Also, in the battery pack loading apparatus according to the present invention, the seat (100) may include a stationary die (110) having a predetermined area, a moving die (120) located above the stationary die (110), the moving die being configured to be brought into contact with the bottom surface of the battery pack (B), and a connection shaft (130) configured to connect the stationary die (110) and the moving die (120) to each other, the length of the connection shaft (130) being adjustable in a vertical direction.

Also, in the battery pack loading apparatus according to the present invention, the moving die (120) may be further provided with at least one first rotary roller (121).

Also, in the battery pack loading apparatus according to the present invention, the rotator (200) may include a pair of first support fixtures (210) spaced apart from each other by a predetermined distance, a rotary plate (220) provided inside each of the pair of first support fixtures (210), the rotary plate being rotatable 360 degrees, and a grip portion (221) provided inside the rotary plate (220), the grip portion being configured to hold and fix one of opposite sides of the battery pack (B) on the seat (100).

Also, in the battery pack loading apparatus according to the present invention, the grip portions being configured to face each other each of the grip portions having a "[" shape so as to hold lateral corners of the battery pack (B).

Also, in the battery pack loading apparatus according to the present invention, each grip portion (221) may be provided on the inner surface thereof with a pad (221') configured to prevent damage to or slippage of the battery pack (B).

Also, in the battery pack loading apparatus according to the present invention, the pad (221') may be made of an elastic material.

Also, in the battery pack loading apparatus according to the present invention, the first transferor (300) may include a transfer plate (310), a hook (320) provided at the transfer plate (310), the hook being configured to hold the battery pack (B) on the seat (100), and a moving shaft (330) configured to vertically and horizontally move the transfer plate (310).

Also, in the battery pack loading apparatus according to the present invention, the hook (320) may be provided in a pair so as to be brought into contact with a lateral side surface and a lateral bottom surface of the battery pack (B) that face each other, and a plurality of pairs of hooks may be provided in a longitudinal direction of the transfer plate.

Also, in the battery pack loading apparatus according to the present invention, the pair of hooks (320) that face each other may be movable in a lateral direction of the battery pack (B).

Also, in the battery pack loading apparatus according to the present invention, the second transferor (400) may include a second support fixture (410), a shelf (420) connected to the second support fixture (410), and a second rotary roller (430) located on the shelf (420), wherein the height of the shelf (420) may be adjustable in a vertical direction.

In addition, a method of loading a battery pack in a battery rack using the battery pack loading apparatus according to the present invention includes a first step of seating the battery pack (B) on the moving die (120) of the seat; a second step of moving the pair of grip portions (221) to fix opposite ends of the seated battery pack (B); a third step of moving the moving die (120) downwards; a fourth step of rotating the battery pack (B) by 180 degrees such that the upper surface of the battery pack (B) faces downwards; a fifth step of moving the moving die (120) to the original position thereof; a sixth step of moving the pair of grip portions (221) to the original positions thereof; a seventh step of operating the first transferor (300) to move the rotated battery pack (B) to the second transferor (400); an eighth step of adjusting the height of the shelf (420) of the second transferor to locate the battery pack (B) in front of a receiving space(S) of the battery rack; and a ninth step of receiving the battery pack (B) in a receiving space(S) of the battery rack.

Advantageous Effects

A battery pack loading apparatus and a loading method for loading a battery pack according to the present invention have an advantage in that a rotary plate capable of being rotated 360 degrees and a grip portion are provided, whereby it is possible to safely rotate a battery pack by a desired angle.

In addition, the battery pack loading apparatus and the loading method according to the present invention have an advantage in that a plurality of transfer units is provided, whereby it is possible to safely move the battery pack to a desired position.

Furthermore, the battery pack loading apparatus and the loading method according to the present invention have an advantage in that a first roller is provided on a moving die, whereby it is possible to easily align the battery pack seated on the moving die and to reduce friction at the time of alignment.

DESCRIPTION OF DRAWINGS

FIG. 1 is a perspective view illustrating rotation of a battery module using a conventional rotation apparatus.

FIG. 2 is a perspective view of a battery pack loading apparatus according to a preferred embodiment of the present invention.

FIG. 3 is a front view of a rotation unit in the battery pack loading apparatus according to the preferred embodiment of the present invention.

FIG. 4 is a sectional view illustrating a seating unit of the battery pack loading apparatus according to the preferred embodiment of the present invention.

FIG. 5 is a perspective view illustrating the rotation unit of the battery pack loading apparatus according to the preferred embodiment of the present invention.

FIG. 6 is a sectional view illustrating the operation of the seating unit and the rotation unit, which are configured to rotate a battery pack, in the battery pack loading apparatus according to the preferred embodiment of the present invention.

FIG. 7 is a perspective view of a first transfer unit in the battery pack loading apparatus according to the preferred embodiment of the present invention.

FIG. 8 is a perspective view of a second transfer unit in the battery pack loading apparatus according to the preferred embodiment of the present invention.

FIG. 9 is a flowchart illustrating a method of loading a battery pack in a battery rack using the battery pack loading apparatus according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack loading apparatus according to the present invention and a battery pack loading method using the same will be described with reference to the accompanying drawings.

In describing a battery pack, a direction in which the length of the battery pack is relatively long is defined as a longitudinal direction, and a direction in which the length of the battery pack is relatively short is defined as a lateral direction.

FIG. 2 is a perspective view of a battery pack loading apparatus according to a preferred embodiment of the present invention, FIG. 3 is a front view of a rotation unit in the battery pack loading apparatus according to the preferred embodiment of the present invention, FIG. 4 is a sectional view illustrating a seating unit of the battery pack loading apparatus according to the preferred embodiment of the present invention, and FIG. 5 is a perspective view illustrating the rotation unit of the battery pack loading apparatus according to the preferred embodiment of the present invention. Referring to FIGS. 2 to 5, the battery pack loading apparatus according to the present invention, configured to load a battery pack B, includes a seating unit 100, a rotation unit 200, a first transfer unit 300, and a second transfer unit 400.

First, the seating unit 100 includes a stationary die 110 having a predetermined area, a moving die 120 located above the stationary die 110, the moving die being configured to be brought into tight contact with the bottom surface of the battery pack B, which is to be loaded in a battery rack, and a connection shaft 130 configured to connect the stationary die 110 and the moving die 120 to each other.

More specifically, the stationary die 110, which is configured to stably support the moving die 120, may include a flat plate and a plurality of support legs or a plurality of frames. However, the construction of the stationary die is not particularly restricted as long as the stationary die is capable of supporting the moving die 120 thereunder.

The shape or size of the moving die 120 is not particularly restricted as long as the moving die is capable of allowing the battery pack B to be stably seated thereon. Since opposite ends of the battery pack B must be fixed by grip portions 221 when the battery pack B is rotated by a predetermined angle, however, it is preferable for the moving die 120 not to be located in the vicinity of the opposite ends of the battery pack B, and it is more preferable to further provide a side plate configured to support the side surface of the battery pack B.

Meanwhile, at least one first rotary roller 121 is provided on the upper surface of the moving die 120. When the battery pack B is brought into tight contact with the grip portions 221, therefore, it is possible to easily move the battery pack to a desired position even in the case in which the center of the moving die 120 and the center of the battery pack B are not exactly aligned with each other when the battery pack is seated on the upper surface of the moving die 120.

As an example, in the case in which the battery pack B is seated on the moving die 120 in a state of being biased to one side thereof (X-axis direction), as shown in FIG. 4(a), one of the grip portions 221, which are connected to a pair of rotary plates 220, comes into tight contact with one end of the battery pack biased to one side thereof first, since the grip portions approach the battery pack B from opposite sides at the same speed. At this time, the battery pack B may be uniformly located on the moving die 120, since the bottom surface of the battery pack B is in tight contact with the first rotary roller 121 (FIG. 4(b)).

Since the first rotary roller 121 is capable of allowing the battery pack B to be easily aligned and minimizing friction at the time of alignment, as described above, it is possible to prevent damage to the battery pack B and to improve workability.

The length of the connection shaft 130, which is located between the stationary die 110 and the moving die 120, is adjustable in order to move the moving die 120 upwards and downwards (Y-axis direction). The construction of the connection shaft 130 is not particularly restricted as long as the connection shaft is capable of performing upward and downward movement.

Meanwhile, the battery pack B includes a plurality of unit modules, and each of the unit modules is configured such that one or more battery cells are connected to each other in series or in parallel. The battery cell, the unit module, and the battery pack are general constructions, and therefore a detailed description thereof will be omitted.

Next, the rotation unit 200, which is configured to rotate the battery pack B seated on the moving die 120 by 180 degrees based on the upper surface of the moving die 120, will be described. The rotation unit 200 includes a pair of first support fixtures 210 spaced apart from each other by a predetermined distance and a rotary plate 220 provided inside each of the pair of first support fixtures 210, the rotary plate being extendable or contractible toward or from the battery pack B, the rotary plate being rotatable up to 360 degrees.

Specifically, the pair of first support fixtures 210 is spaced apart from each other by a predetermined distance in the state in which the seating unit 100 is located therebetween, and serves to support the respective rotary plates 220.

The rotary plate 220 provided inside each of the first support fixtures 210 so as to face the seating unit 100 includes a grip portion 221 configured to hold and fix the vicinity of a corresponding one of the opposite ends of the battery pack B and a sensor 222. Specifically, a pair of grip portions 221, each of which is configured to have a "[" shape so as to hold lateral corners of the battery pack B, is provided at a corresponding one of the rotary plates 220. In addition, it is preferable for a pad 221' to be further provided at the inner surface of the grip portion 221. The reason for this is that, when the grip portion 221 holds and fixes the corners of the battery pack B, it is possible to prevent slippage between the grip portion 211 and the battery pack B or damage to the grip portion and the battery pack.

Here, the construction of the pad 221' is not particularly restricted as long as the pad is capable of performing the above function. The pad may be made of a material that exhibits predetermined elasticity and roughness, such as rubber. However, the construction of the pad is not particularly restricted as long as the pad is capable of performing the above function.

The sensor 222, which is located at the center of the inside of the rotary plate 220 prevents damage to the battery pack B and furthermore determines whether the grip portions 221 have properly fixed the battery pack B.

As previously described, the pair of rotary plates 220, to which the grip portions 221 are mounted, respectively, approaches the battery pack B at the same speed from opposite sides to fix the opposite ends of the battery pack B. In the case in which the rotary plates 220 excessively extend toward the battery pack B, the vicinities of the ends of the battery pack B may be damaged. In the case in which the rotary plates do not sufficiently extend, on the other hand, the battery pack B may not be properly fixed by the grip portions 221, whereby a serious accident may occur.

However, the above problems may be solved by the provision of the sensor 222. As an example, the sensor 222 may be a button type sensor capable of sensing pressure. One or more sensors 222 may be mounted at each of the rotary plates 220, and control may be performed such that extension of the rotary plate 220 is stopped when the measured values of the sensors 222 reach a predetermined range.

FIG. 6 is a sectional view illustrating the operation of the seating unit and the rotation unit, which are configured to rotate the battery pack, in the battery pack loading apparatus according to the preferred embodiment of the present invention.

An operation method for rotating the battery pack B placed on the seating unit 100 by a predetermined angle, e.g. 180 degrees, such that one surface of the battery pack directed to the moving die 120 faces upwards by the operation of the seating unit 100 and the rotation unit 200 having the above constructions will be described. First, opposite sides of the battery pack B seated on the moving die 120 are held by the grip portions 221 in a tight contact state (FIG. 6(a)). Subsequently, the connection shaft 130 of the moving die 120 is moved downwards (Y-axis direction) to secure a space in which the battery pack B is rotatable (FIG. 6(b)), and the rotary plates 220, to which the grip portions 221 are connected, are rotated to rotate the battery pack B (FIG. 6 (c)).

Finally, the connection shaft 130 is moved upwards (Y-axis direction) and is returned to the original position thereof. As a result, the moving die 120 supports the battery pack B, rotation of which has been completed (FIG. 6(d)).

Next, the first transfer unit 300, which is configured to lift up the battery pack B seated on the moving die 120 and to move the battery pack to the second transfer unit 400, will be described. Of course, it is obvious that the first transfer unit 300 may also be used when the battery pack B required to be rotated is transferred to the moving die 120.

Referring to FIG. 7, which is a perspective view of the first transfer unit in the battery pack loading apparatus according to the preferred embodiment of the present invention, together with FIG. 2, the first transfer unit 300 includes a transfer plate 310, a hook 320 of the transfer plate 310, and a moving shaft 330 configured to vertically and horizontally move the transfer plate 310.

The hook 320, which is connected to the bottom surface or the side surface of the transfer plate 310, is configured to securely hold the battery pack B seated on the seating unit 100. When provided at the side surface of the transfer plate, the hook may have an approximately L-shape. That is, the hook 320 may include a vertical portion 321 configured to be brought into tight contact with a lateral side surface of the battery pack B and a horizontal portion 322 configured to be brought into tight contact with the lateral bottom surface of the battery pack B.

It is preferable for two hooks 320 to form a pair that face each other so as to be brought into tight contact with the lateral side surface and the lateral bottom surface of the battery pack B such that the battery pack B can be stably moved to a predetermined position, specifically the second transfer unit, after being lifted up. It is more preferable for a minimum of two pairs of hooks to be provided in the longitudinal direction of the battery pack B.

Here, it is obvious that the hooks 320 can be moved in the lateral direction of the battery pack B in order to hold or release the battery pack B.

The moving shaft 330 connected to the upper part of the transfer plate 310 is configured to move the transfer plate 310 to a desired position, and is rotatable 360 degrees in addition to upward and downward movement (Y-axis direction).

FIG. 8 is a perspective view of the second transfer unit in the battery pack loading apparatus according to the preferred embodiment of the present invention. The second transfer unit 400 will be described with reference to FIG. 8 together with FIG. 2.

The second transfer unit 400, which is configured to transfer the battery pack B to the front of a receiving space S of the battery rack, a description of which will follow, includes a second support fixture 410, a shelf 420 connected to the second support fixture 410, and a second rotary roller 430 located on the shelf 420.

The second support fixture 410, which is configured to support the shelf 420, is provided with an elevating chain (not shown) configured to locate the shelf 420 at a desired height. The second rotary roller 430 on the shelf 420 is identical in construction to the first rotary roller 121, and is configured to allow the battery pack B to be moved even with small force when the battery pack B is received in the battery rack 500, whereby work is easily performed.

Meanwhile, the battery rack 500 includes a vertical frame 510 and a horizontal frame 520. A plurality of vertical frames 510, e.g. four vertical frames, may be provided so as to be spaced apart from each other by a predetermined distance in order to support corners of a battery pack having an approximately hexahedral shape. However, the number of the vertical frames may be changed, as needed. For example, six vertical frames may be provided.

The horizontal frame 520 is located inside the vertical frame 510 so as to receive a plurality of battery packs in multiple stages. Specifically, the horizontal frame 520 includes a vertical support portion fixed to the inner surface of the vertical frame 510 and a horizontal support portion extending perpendicularly from the lower edge of the vertical support portion, whereby the horizontal frame has an approximately L-shape.

A plurality of horizontal frames 520, each of which is configured as described above, is provided so as to be spaced apart from each other by a predetermined distance in a height direction of the vertical frame 520 such that the lower edge of the battery pack B is supported by a receiving space S configured to receive the battery pack B therein, i.e. a pair of horizontal support portions that face each other.

Next, a method of loading the battery pack B in the battery rack will be described. FIG. 9 is a flowchart illustrating the method of loading the battery pack in the battery rack using the battery pack loading apparatus according to the present invention.

Referring to FIG. 9, the battery pack loading method according to the present invention includes a first step of seating the battery pack B on the moving die 120, a second step of moving the pair of grip portions 221 to fix opposite ends of the seated battery pack B, a third step of moving the moving die 120 downwards, a fourth step of rotating the battery pack B such that the upper surface of the battery pack B faces downwards, a fifth step of moving the moving die 120 to the original position thereof, a sixth step of moving the pair of grip portions 221 to the original positions thereof, a seventh step of moving the rotated battery pack B, an eighth step of locating the battery pack B in front of the receiving space S of the battery rack 500, and a ninth step of receiving the battery pack B in the receiving space S of the battery rack 500.

Specifically, in the first step, which is a step of seating the battery pack B on the moving die 120, the battery pack B, which is stored in a separate place, is seated on the upper surface of the moving die 120 using the first transfer unit 300.

In the second step, the pair of grip portions 221 is moved to hold and fix four corners of the battery pack B.

In the third step, the moving die 120 is moved downwards in the state in which the battery pack B is fixed in order to secure a space in which the battery pack B is rotatable.

In the fourth step, the pair of grip portions 221 is rotated 180 degrees, whereby the battery pack B is also rotated 180 degrees, and therefore the upper surface of the battery pack B faces downwards.

In the fifth step, the moving die 120 is moved upwards to the original position thereof and supports the battery pack in a state of being rotated 180 degrees again in order to separate the grip portions 221 from the battery pack.

In the sixth step, the grip portions 221, which are holding and fixing the battery pack B, are moved to the original positions thereof. In the seventh step, the battery pack B in a rotated state is seated on the second rotary roller 430 located on the upper surface of the shelf 420 of the second transfer unit 400 using the first transfer unit 300.

In the eighth step, the shelf 420 of the second transfer unit 400 is moved upwards or downwards such that the battery pack B is located in front of the receiving space S of the battery rack 500 in which the battery pack is to be received.

In the ninth step, force is applied to the battery pack B located in front of the receiving space S such that the battery pack is inserted into and loaded in the battery rack 500.

Subsequently, the first to ninth steps are repeatedly performed in order to receive a desired number of battery packs B in the battery rack 500.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Seating unit
110: Stationary die
120: Moving die
121: First rotary roller
130: Connection shaft
200: Rotation unit
210: First support fixture
220: Rotary plate
221: Grip portion 221': Pad
222: Sensor
300: First transfer unit
310: Transfer plate
320: Hook
321: Vertical portion 322: Horizontal portion
330: Moving shaft
400: Second transfer unit
410: Second support fixture
420: Shelf
430: Second rotary roller
500: Battery rack
510: Vertical frame
520: Horizontal frame B: Battery pack
S: Receiving space

The invention claimed is:

1. A battery pack loading apparatus comprising:
   a seat configured to allow a battery pack to be seated thereon;
   a rotator configured to rotate the battery pack on the seat by a predetermined angle;
   a first transferor configured to move the battery pack rotated by the predetermined angle to a predetermined position;
   a second transferor configured to transfer the battery pack transferred by the first transferor to a battery rack; and
   at least one first rotary roller on the seat to allow movement of a battery pack relative to the seat,
   wherein the rotator comprises:
      a pair of first support fixtures spaced apart from each other by a predetermined distance;
      a rotary plate provided inside each of the pair of first support fixtures, the rotary plate being rotatable 360 degrees; and
      grip portions provided inside the rotary plate, the grip portions being configured to hold and fix one of opposite sides of the battery pack on the seat,
      wherein the grip portions are configured to face each other, each of the grip portions having a "[" shape so as to hold lateral corners of the battery pack, and
      wherein the grip portions are configured to wrap around a portion of an upper surface, a portion of a lower surface and side surfaces of the lateral corners of the battery pack.

2. The battery pack loading apparatus according to claim 1, wherein the seat comprises:
   a stationary die having a predetermined area;
   a moving die located above the stationary die, the moving die being configured to be brought into contact with a bottom surface of the battery pack; and
   a connection shaft configured to connect the stationary die and the moving die to each other, a length of the connection shaft being adjustable in a vertical direction.

3. The battery pack loading apparatus according to claim 2, wherein the at least one first rotary roller is on the moving die.

4. The battery pack loading apparatus according to claim 2, wherein the moving die comprises a pair of L-shaped brackets, each bracket configured to contact two sides of the battery pack.

5. The battery pack loading apparatus according to claim 1, wherein each grip portion is provided on an inner surface thereof with a pad configured to prevent damage to or slippage of the battery pack.

6. The battery pack loading apparatus according to claim 5, wherein the pad is made of an elastic material.

7. The battery pack loading apparatus according to claim 1, wherein the first transferor comprises:
   a transfer plate;
   a hook provided at the transfer plate, the hook being configured to hold the battery pack on the seat; and
   a moving shaft configured to vertically and horizontally move the transfer plate.

8. The battery pack loading apparatus according to claim 7, wherein the hook is provided in a pair that face each other so as to be brought into contact with a lateral side surface and a lateral bottom surface of the battery pack, and
   wherein a plurality of pairs of hooks is provided in a longitudinal direction of the transfer plate.

9. The battery pack loading apparatus according to claim 8, wherein the pair of hooks that face each other is movable in a lateral direction of the battery pack.

10. The battery pack loading apparatus according to claim 1, wherein the second transferor comprises:
a second support fixture;
a shelf connected to the second support fixture; and
a second rotary roller located on the shelf,
wherein a height of the shelf is adjustable in a vertical direction.

11. The battery pack loading apparatus according to claim 1, wherein the rotator has a sensor.

12. The battery pack loading apparatus according to claim 11, wherein the sensor is a pressure sensor.

13. The battery pack loading apparatus according to claim 11, wherein the rotator has a rotary plate, and
wherein the sensor is a pressure sensor is at a center of the rotary plate.

14. A method of loading a battery pack in a battery rack using the battery pack loading apparatus according to claim 1, the method comprising:

a first step of seating the battery pack on a moving die of the seat;
a second step of moving a pair of grip portions to fix opposite ends of the seated battery pack;
a third step of moving the moving die downwards;
a fourth step of rotating the battery pack by 180 degrees such that an upper surface of the battery pack faces downwards;
a fifth step of moving the moving die to an original position thereof;
a sixth step of moving the pair of grip portions to original positions thereof;
a seventh step of operating the first transferor to move the rotated battery pack to the second transferor;
an eighth step of adjusting a height of a shelf of the second transferor to locate the battery pack in front of a receiving space of the battery rack; and
a ninth step of receiving the battery pack in the receiving space of the battery rack.

* * * * *